United States Patent [19]

Gafford

[11] 4,427,207
[45] Jan. 24, 1984

[54] HYDRAULIC SYSTEM PROVIDING EQUALIZED LOAD ON IMPLEMENT SUPPORT WHEELS

[75] Inventor: Alexander T. Gafford, La Porte, Ind.

[73] Assignee: Allis-Chalmers Corporation, Milwaukee, Wis.

[21] Appl. No.: 321,318

[22] Filed: Nov. 13, 1981

[51] Int. Cl.³ .............................................. B62D 33/08
[52] U.S. Cl. ................................ 280/43.23; 280/714; 172/401; 91/520
[58] Field of Search ............... 280/43.13, 43.14, 43.23, 280/104, 81 R, 702, 714, 6 H; 172/400, 401 X, 406, 405, 413, 421, 414; 91/520 X

[56] References Cited

U.S. PATENT DOCUMENTS

| | | | |
|---|---|---|---|
| 3,356,382 | 12/1967 | Fay | 280/43.23 |
| 3,411,800 | 11/1968 | Krumholz | 280/43.23 |
| 3,486,761 | 12/1969 | Fay | 280/43.23 |
| 3,666,284 | 5/1972 | Hunter | 280/43.23 |
| 3,700,041 | 10/1972 | Ryan | 172/413 |
| 4,337,959 | 7/1982 | Bettin | 280/43.23 |
| 4,354,688 | 10/1982 | Swanson | 280/43.23 |

*Primary Examiner*—David M. Mitchell
*Assistant Examiner*—Joseph McCarthy
*Attorney, Agent, or Firm*—Charles L. Schwab

[57] ABSTRACT

An implement frame (12) is supported by two pairs of laterally spaced wheels (36, 37 and 38, 39) whose vertical position relative to the frame is controlled by a pair of parallel master cylinders (61, 62) connected to one pair of wheels (36, 37) and a pair of parallel connected slave cylinders (63, 64) connected to the second pair of wheels (38, 39). The master and slave cylinders are series connected to provide even raising and lowering of the implement frame. The parallel connections between corresponding ends of the master and slave cylinders (61, 62, 63, 64) provide a walking beam effect with resulting equal loading on the wheels (36, 37, 38, 39).

3 Claims, 6 Drawing Figures

HYDRAULIC SYSTEM PROVIDING EQUALIZED LOAD ON IMPLEMENT SUPPORT WHEELS

BACKGROUND OF THE INVENTION

1. Technical Field of the Invention

This invention relates to a hydraulic system for vertically adjusting support wheels of an agricultural implement wherein master and slave cylinders are used.

2. Background of the Invention

Heretofore others have used master/slave hydraulic systems to evenly adjust implement support wheels. Several such systems are shown in U.S. Pat. Nos. 3,411,800; 3,356,382; 3,486,761 and 3,666,284. Two other master/slave hydraulic systems for adjusting implement support wheels, which have been used in equipment manufactured by Allis-Chalmers Corporation, are shown in FIGS. 5 and 6 of the attached drawings. Although these prior master/slave hydraulic systems provide desired even raising and lowering of the implement frame, they do not provide the solution to the problem of equalizing the wheel loading in a four-wheel implement support system.

BRIEF DESCRIPTION OF THE INVENTION

This invention finds utility in an implement which has a laterally extending frame supported by at least four support wheels. Four independent support wheels are rotatably mounted on first and second laterally spaced pairs of wheel supports which are pivotally connected to laterally spaced points on the implement frame for individual vertical swinging movement about axes transverse to the direction of movement of the implement when supported by the wheels and towed by a draft vehicle. A pair of parallel connected double-acting hydraulic master cylinders are operably interposed between the implement frame and one pair of wheel supports. A pair of parallel connected hydraulic slave cylinders are operably imposed between the frame and the other pair of wheel supports. Conduit means connect the parallel connected master cylinders in a source of pressurized hydraulic fluid and in series with the parallel connected slave cylinders. The master and slave cylinders are operable to evenly raise and lower the implement frame. By hydraulically connecting the master cylinders in parallel and the slave cylinders in parallel, a walking beam effect is provided for the wheels associated with the parallel connected cylinders thereby equalizing the loads on the wheels.

DETAILED DESCRIPTION OF THE INVENTION

Figure 1:
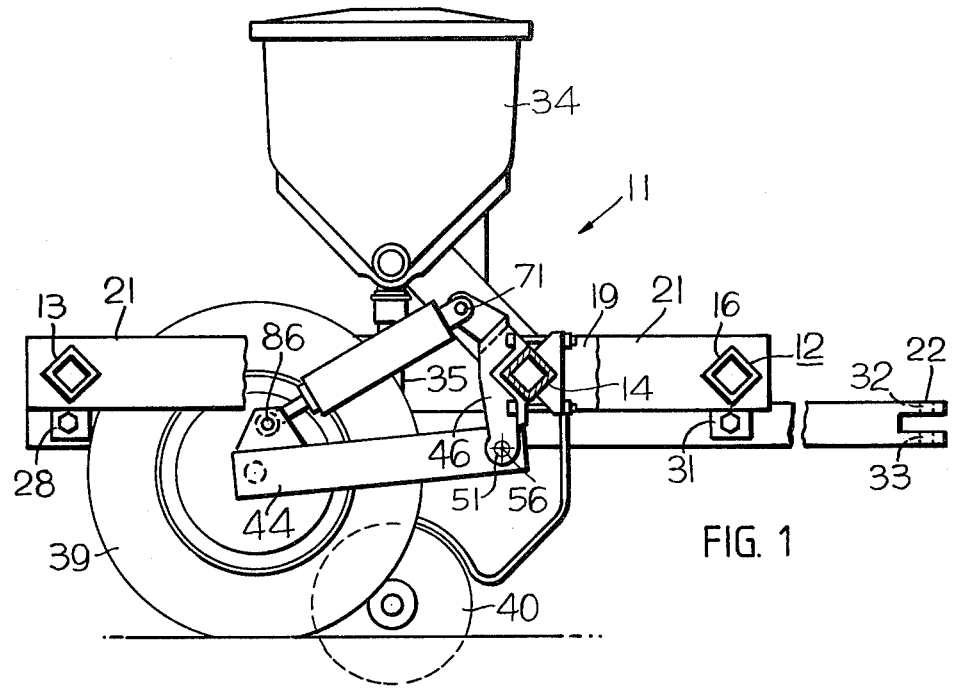
FIG. 1 is a side view of an agricultural implement incorporating the present invention with the support wheels retracted to place the implement in a ground working condition.
Figure 2:
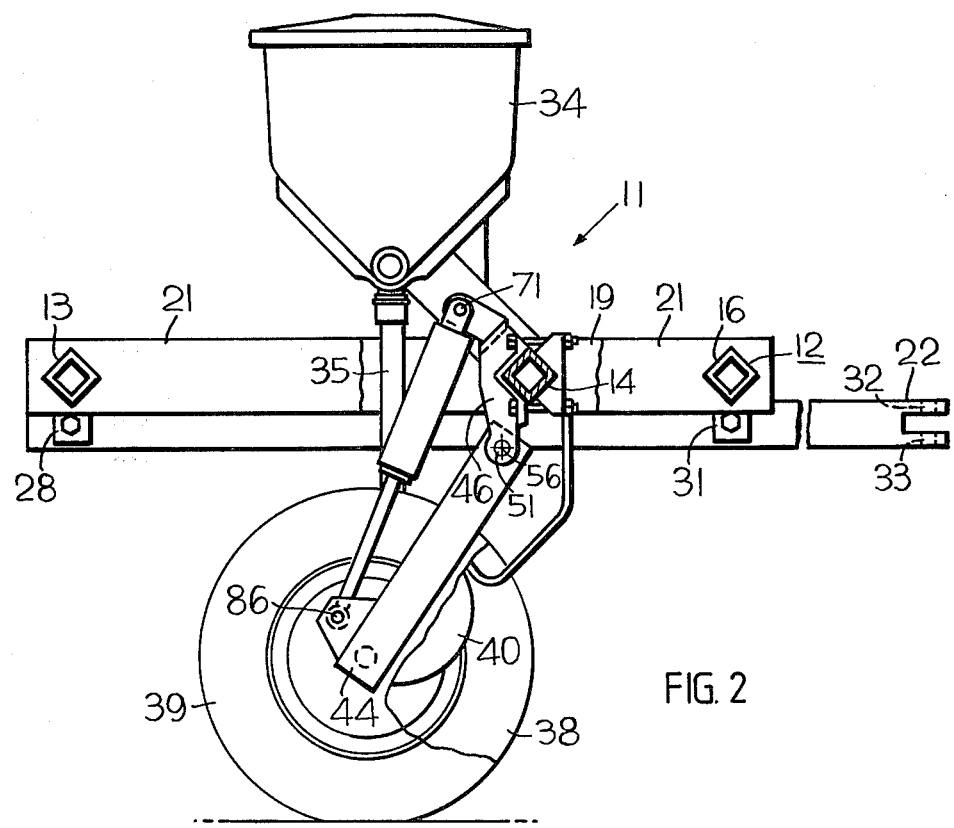
FIG. 2 is a side view similar to FIG. 1 but showing the implement frame raised to a transport position.
Figure 3:
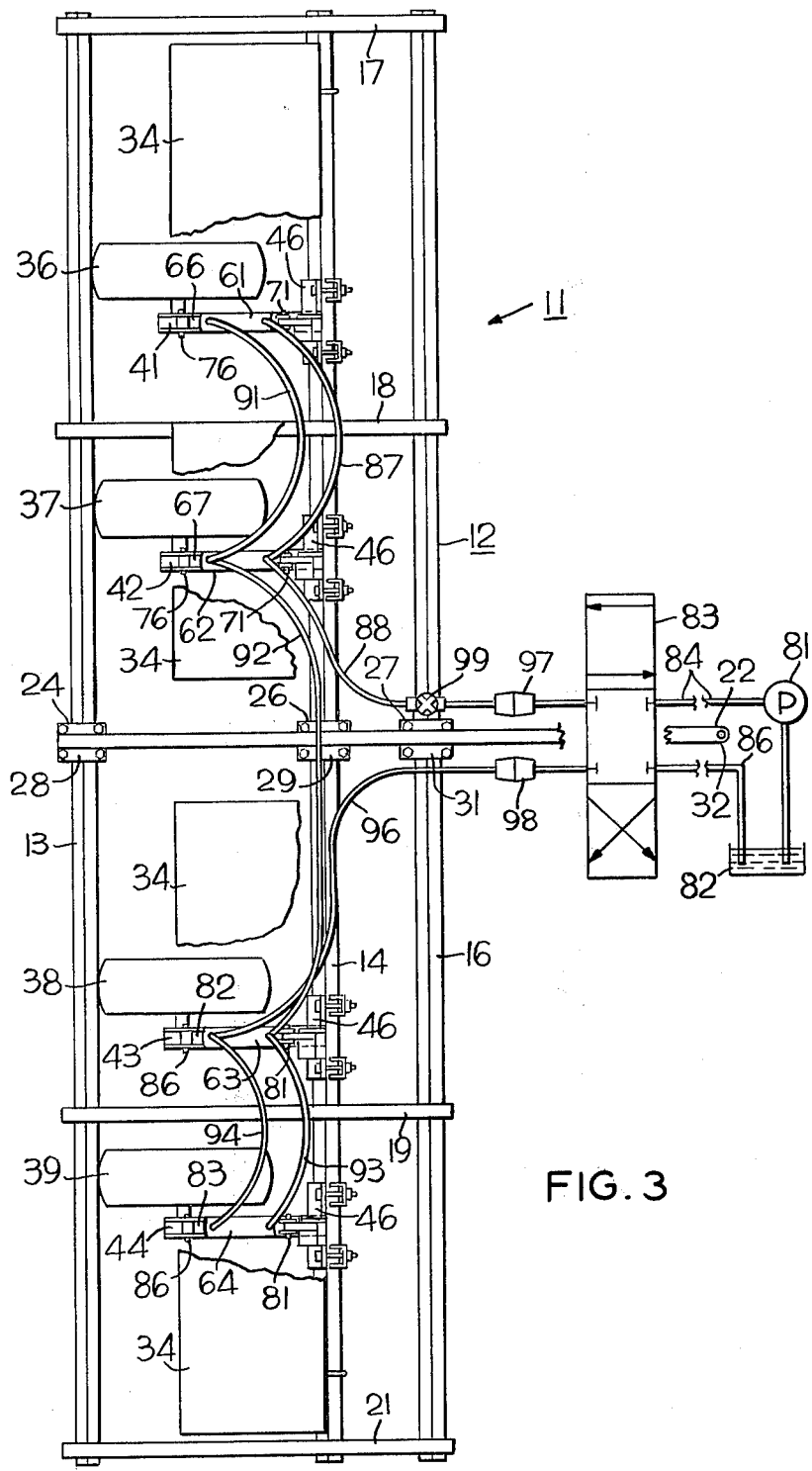
FIG. 3 is a top view of the implement shown in FIG. 1 with parts broken away for illustration purposes.

Referring to FIGS. 1, 2 and 3, part of an agricultural implement 11, in the form of a planter, is illustrated which includes a laterally extending frame 12 with three transverse horizontal tool bars 13, 14 and 16 interconnected by horizontal fore and aft extending beams 17, 18, 19 and 21. An implement draft tongue 22 is connected to the transverse tool bars 13, 14 and 16 by suitable brackets 24, 26, 27, 28, 29 and 31. The forward end of the tongue 22 is adapted for connection with a towing vehicle, such as a tractor, in a conventional manner such as by connecting the front end of the tongue to a tractor draw bar by a pin, not shown, which would extend through aligned openings 32, 33. Fertilizer hoppers 34 are mounted on the implement frame 12 and during operation dispense fertilizer through discharge tubes 35 to slots in the ground formed by disk openers 40 mounted on the central tool bar 14. A plurality of single row planter units, not shown, may be secured to the rear tool bar 13 in a conventional manner.

The implement frame 12 is supported by vertically adjustable support wheels 36, 37, 38 and 39 rotatably mounted on the rear ends of wheel supports or arms 41, 42, 43 and 44, the latter being pivotally connected at their forward ends to brackets 46 secured to the center tool bar 14. The pivot connections include aligned pins 51 whose axes lie in a common horizontal transverse axis 56. Wheel supports 41, 42 are adjusted in their vertical swinging movement relative to the implement frame 12 by a pair of double acting master cylinders 61, 62 and wheel supports 43, 44 are adjusted in their vertical swinging movement by a pair of double-acting slave cylinders 63, 64. Corresponding ends of the cylindric master cylinders 61, 62 are pivotally connected to brackets 46 by aligned horizontal transverse pivot pins 71 and the extensible rods 66, 67 of the hydraulic cylinders 61, 62 are pivotally connected to the rear ends of the wheel supports 41, 42 by pivot pins 76. Similarly, the hydraulic slave cylinders 63, 64 have corresponding ends pivotally connected to the brackets 46 by a pair of aligned horizontal transverse pins 81 and have their extensible rods 82, 83 pivotally connected to the rear ends of the wheel supports 43, 44 by pivot pins 86.

Referring to FIG. 3, a source of pressurized hydraulic fluid, in the form of pump 81, is provided on the towing vehicle. The pump 81 may be driven by the engine of the towing vehicle which also may include a suitable fluid reservoir 82 from which the pump 81 draws fluid. Pressurized fluid is supplied by the pump 81 to a control valve 83 by way of conduit 84. A return to reservoir line 86 connects the hydraulic control valve 83 to the reservoir 82. The closed ends of the double acting master cylinders 61, 62 are connected in parallel by a conduit 87 and conduit 87 is connected in free fluid flow communication with conduit means in a form of conduit 88 which is connected to the control valve 83. The corresponding rod ends of the master cylinders 61, 62 are interconnected by a conduit 91 which is connected in free fluid flow communication with a conduit 92 connecting the rod ends of the master cylinders 61, 62 in series to the closed ends of parallel connected slave cylinders 63, 64. The double-acting slave cylinders 63, 64 have their closed ends interconnected by a conduit 93 which is in free flow fluid communication with conduit 92. The rod ends of the slave cylinders 63, 64 are interconnected by a conduit 94 which is connected in free fluid flow communication with a conduit means in the form of conduit 96 which is connected to the control valve 83. Quick disconnect couplings 97, 98 are provided in the conduits means 88, 96 so that the lines can be disconnected from the towing tractor when the implement is disconnected from the towing tractor. Also, a normally open, manually operated shutoff valve 99 may be provided in the conduit 88 to lock the fluid in the master slave hydraulic system and relieve the coupling 97 of hydraulic pressure at those times when the implement is disconnected from its towing tractor or when being transported for long distances.

Figure 4:
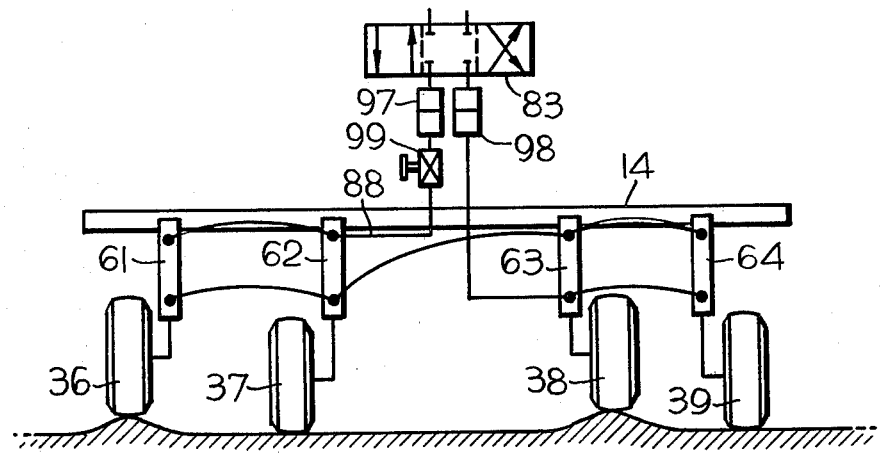
FIG. 4 is a schematic showing of the hydraulic system of the present invention illustrating the equalization of load afforded by the parallel connected master cylinders and the parallel connected slave cylinders.

An important advantage of the use of parallel connected master cylinders and the parallel connected slave cylinders is the equalization of implement load on the support wheels when traversing uneven ground. This is illustrated in FIG. 4 in which wheels 36 and 38 are shown on top of raised portions of the ground. Since the fluid in conduit 88 is blocked at the control valve any contraction of cylinder 61 will cause extension of cylinder 62. This provides a desired walking beam effect wherein the part of the implement frame supported by wheels 36, 37 is raised only one-half as much as it would have been raised if the two master cylinders had not been connected hydraulically in parallel. A similar walking beam effect is achieved at the other side of the implement through the use of parallel connected slave cylinders 63, 64. As usual in master/slave systems the master and slave cylinders are sized so that fluid displaced by extension of the master cylinders will cause equal extension of the slave cylinders. This provides even raising and lowering of the implement frame. The parallel connected master cylinders and parallel connected slave cylinders provide equal loading of the support wheels in addition to the desirable walking beam effect minimizing vertical movement of the implement when traversing uneven ground. This permits a better field operation to be performed when the support wheels are used to control depth of ground working tools which may be mounted on the implement frame.

Figure 5:
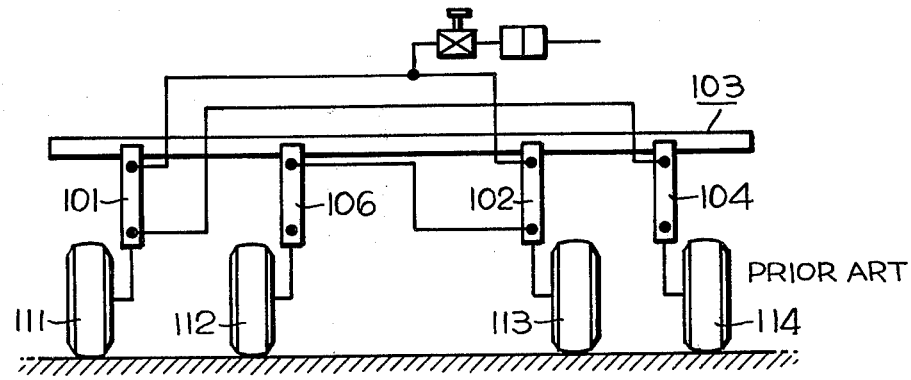
FIG. 5 shows one master/slave hydraulic system heretofore used for four implement transport wheels.

Referring to the prior art construction of FIG. 5, it will be noted that a pair of parallel connected master cylinders 101, 102 are placed at opposite sides of a schematically shown rigid frame implement 103. However, when fluid is transversed from the closed end of one master cylinder to the closed end of the other master cylinder, the opposite sides of the implement will be moved in opposite vertical directions. The slave cylinders 104, 106 will be moving in vertical directions opposite to the adjacent master cylinders. In operation, when wheel 111 rolls over a raised area, any contraction of cylinder 101 caused thereby will cause the opposite side of the implement to be raised by the expansion of cylinder 102 and lowering of wheel 113. If wheel 112 traverses a raised area, the increase in weight carried by slave cylinder 106 will cause it to contract sending fluid to the rod end of master cylinder 102. This raises wheel 113 and transfers fluid to the closed end of master cylinder 101 expanding it to raise the left side of the implement. Thus, when either a master cylinder supported wheel 111 or 112 or a slave cylinder supported wheel 113 or 114 traverses uneven ground the vertical position of the opposite side of the implement is affected. This is not operationally desirable in planting and tillage operations. Additionally, the load on the cylinders will not be equalized.

Figure 6:
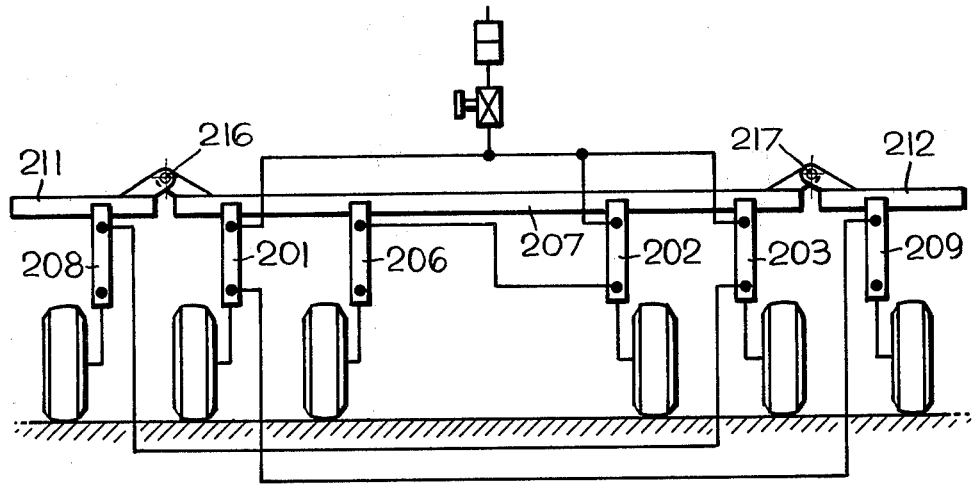
FIG. 6 shows another prior art master/slave system for an implement utilizing four support wheels for a main frame and a single support wheel on each of two wing frame sections hinged to opposite lateral sides of the main frame.

In the prior art master/slave system shown schematically in FIG. 6, three parallel-connected master cylinders 201, 202 and 203 and a slave cylinder 206 support a main frame 207 and slave cylinders 208, 209 support lateral implement wing sections 211, 212 which are pivotally connected to the main frame 207 for swinging movement about horizontal axes 216, 217. A shortcoming of the FIG. 6 prior art system is that contraction or extension of a master cylinder adversely affects the vertical position of the opposite side of the implement main frame.

In summary, when an irregularity in the ground is encountered by a wheel of an implement incorporating the present invention, only one side of the vehicle is raised and an equal loading of the wheels and support cylinders is achieved.

The embodiments of the invention in which an exclusive property or privilege is claimed are defined as follows:

1. An implement having a laterally extending frame, supported on at least four vertically adjustable support wheels and adapted to be connected in draft relation to a tractor characterized by, first and second laterally spaced pairs of wheel supports rotatably supporting said wheels and pivotally connected to laterally spaced points on said frame for individual vertical swinging movement about axes transverse to the direction of movement of said implement when supported by said wheels, first and second double-acting hydraulic master cylinders operatively interposed between said frame and said first pair of said wheel supports, first and second hydraulic slave cylinders operatively interposed between said frame and said second pair of wheel supports, a source of pressurized hydraulic fluid including a pump and fluid reservoir, conduit means connecting first corresponding ends of said master cylinders in parallel to said source of pressurized hydraulic fluid, conduit means connecting second corresponding ends of said master cylinders in parallel, conduit means connecting first corresponding ends of said slave cylinders in parallel, and conduit means connecting said second corresponding ends of said master cylinders in series with said first corresponding ends of said slave cylinders, said master and slave cylinders being operable to evenly raise and lower said frame and the parallel connections of said master and slave cylinders providing equalized load upon said support wheels.

2. The implement of claim 1 and further comprising conduit means connecting second corresponding ends of said slave cylinders in parallel and conduit means connecting said second corresponding ends of said slave cylinders to said source of pressurized hydraulic fluid.

3. The implement of claim 2 and further comprising a control valve operatively interposed in said conduit means connected to said source of pressurized hydraulic fluid.

* * * * *